(12) United States Patent
Lim

(10) Patent No.: US 9,552,846 B1
(45) Date of Patent: Jan. 24, 2017

(54) VARIABLE SPEED DATA STORAGE DEVICE TESTING SYSTEM

(71) Applicant: Seagate Technology LLC, Cupertino, CA (US)

(72) Inventor: Teck Khoon Lim, Singapore (SG)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/141,178

(22) Filed: Apr. 28, 2016

(51) Int. Cl.
  G11B 5/00 (2006.01)
  G11B 27/36 (2006.01)
  G11B 5/09 (2006.01)
  G11B 19/28 (2006.01)

(52) U.S. Cl.
  CPC ............ G11B 27/36 (2013.01); G11B 19/28 (2013.01)

(58) Field of Classification Search
  CPC ............ G11B 2005/0005; G11B 5/314; G11B 5/6005; G11B 5/59633; G11B 5/54; G11B 27/36; G11B 5/012; G11B 11/0515; G11B 11/10595; G11B 11/1058; G11B 11/0558; G11B 7/1267; G11B 7/126; G11B 2220/20

USPC ............ 360/59, 313, 75, 328, 31, 53, 73.08; 369/13.02, 13.14, 13.17, 13.33, 112.23, 369/30.21, 47.53, 53.1
  See application file for complete search history.

(56) References Cited

U.S. PATENT DOCUMENTS

| 6,239,951 | B1 | 5/2001 | Wang et al. |
| 6,754,151 | B2 | 6/2004 | Watt |
| 6,963,525 | B2 * | 11/2005 | Honda ................ G11B 7/1267 369/47.53 |
| 7,023,665 | B2 | 4/2006 | Riener |
| 7,535,807 | B2 | 5/2009 | Chiu et al. |
| 8,730,612 | B1 | 5/2014 | Haralson |

\* cited by examiner

*Primary Examiner* — Nabil Hindi
(74) *Attorney, Agent, or Firm* — Hall Estill Attorneys at Law

(57) ABSTRACT

A data storage device can be tested while spinning at a variety of different speeds. Data may be written to a data sector with a transducing head while at least one disk of a data storage device spins about a spindle at a default speed. One or more tests can subsequently be executed on the disk by reading servo data stored on the disk while the disk spins at a test speed that is greater than the default speed.

20 Claims, 3 Drawing Sheets

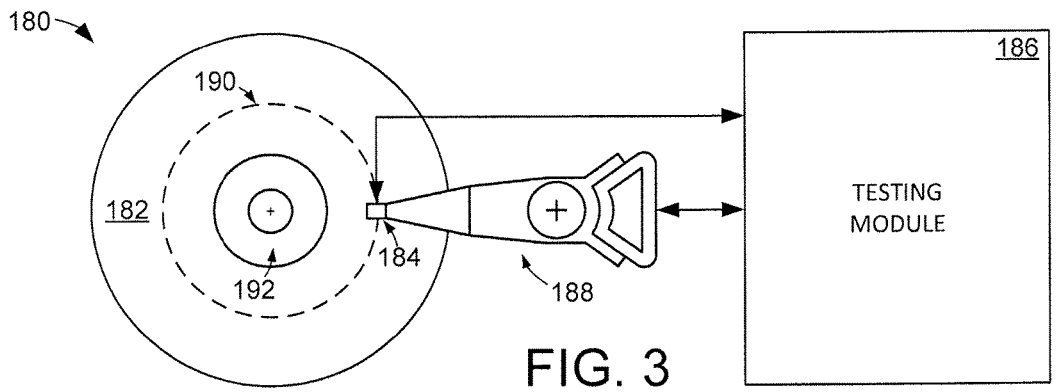
FIG. 3
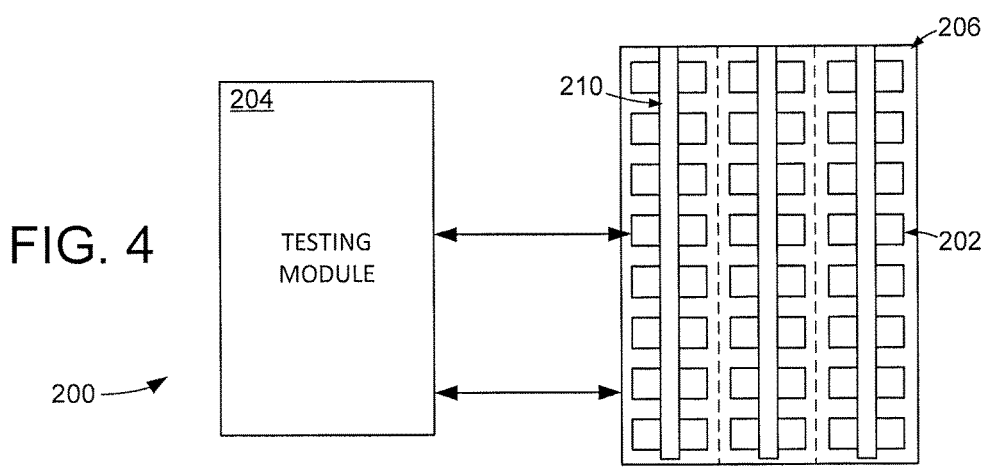
FIG. 4
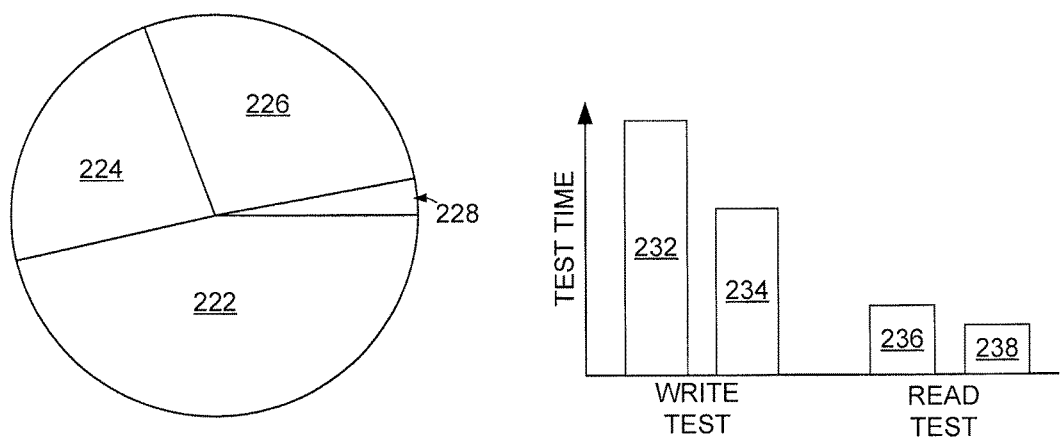
FIG. 5
FIG. 6

_US 9,552,846 B1_

VARIABLE SPEED DATA STORAGE DEVICE TESTING SYSTEM

SUMMARY

A data storage device testing system, in accordance with various embodiments, can write data to a data sector with a transducing head while at least one disk of a data storage device spins about a spindle at a default speed. One or more tests are then executed on the disk by reading servo data stored on the disk while the disk spins at a test speed that is greater than the default speed.

BRIEF DESCRIPTION OF THE DRAWINGS

FIG. 3 shows example test equipment that may be used with the data storage device of FIG. 2 in accordance various embodiments.

FIG. 4 illustrates example test equipment that may be used with the data storage device of FIG. 2 in accordance some embodiments.

FIG. 5 graphs example testing data for an example data storage device in accordance with various embodiments.

FIG. 6 plots example testing data for an example data storage device in accordance with assorted embodiments.

DETAILED DESCRIPTION

Figure 1:
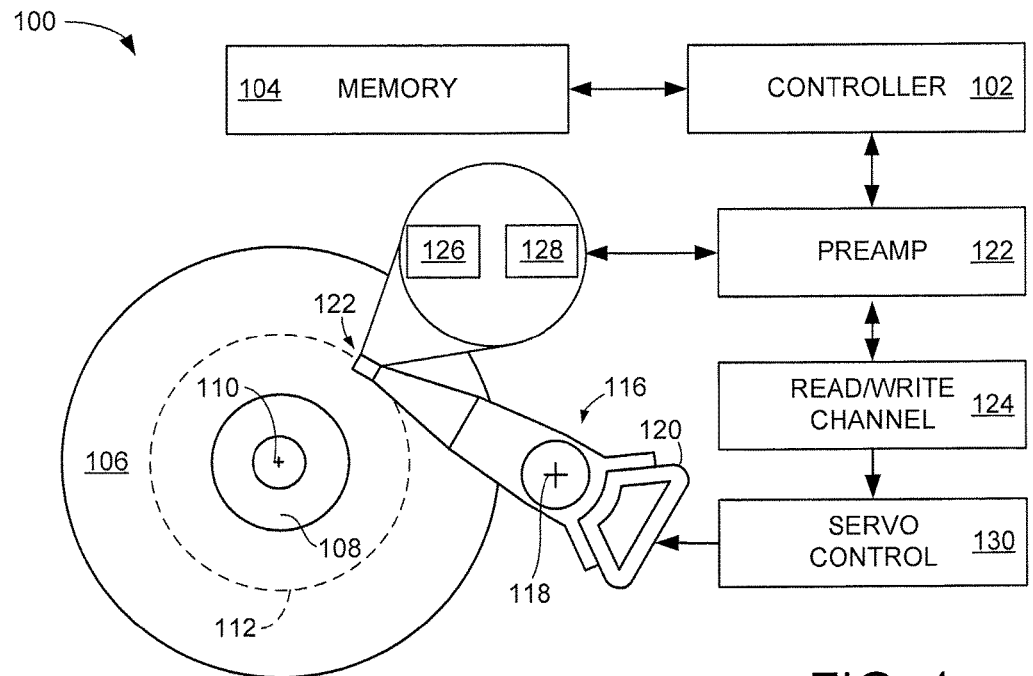
FIG. 1 represents an example data storage system constructed and operated in accordance with various embodiments.

Advances in data storage device technology have corresponded with quality assurance and operation tests that occupy greater amounts of time. Tests that ensure proper structure and function of a data storage device can be time consuming during the manufacturing process, which in turn decreases the throughput of a factory. Although some data storage device tests can be postponed until after the product has left the factory, the assorted tests remain time intensive and detrimental to the full operating capabilities of a data storage device. Hence, there is an ongoing need for more efficient means for completing structural and operational tests on modern data storage devices.

Accordingly, a data storage device testing system can, in accordance with various embodiments, write data to a data sector with a transducing head while a disk spins at a default speed and execute at least one test on the disk by reading servo data stored on the disk while the disk spins at a test speed that is greater than the default speed. The utilization of an increased test speed for the disk reduces the overall test time for a data storage device and allows some testing to be conducted after the data storage device leaves a manufacturing facility. Also, the execution of tests relating to data tracks on a disk allows the faster rotating test speed to detect servo data without concern for data writing errors that can plague testing at increased disk speeds.

In order to optimize the use of a data storage device factory, less than all structural and operational tests are conducted at the factory. That is, a data storage device leaves the factory with at least one pending test that is needed to enable the full capabilities of the data storage device. While some data storage device tests are best executed on factory controlled spin stands and/or test racks, such as transducing head fly height, that require precise monitoring and adjustments, various tests merely read data, such as servo data, from a disk which corresponds with a reduced need for factory precision. Thus, assorted embodiments transfer some data storage device tests to an end-user for execution at a later time.

However, the increased data capacity of modern data storage devices can correspond with relatively large testing times, particularly for track dependent tests that measure and align data tracks on a disk. As a result, device testing can occupy hours of time that delays a user's ability to fully utilize the capabilities of the data storage device. Therefore, various embodiments employ a faster than default rotational disk speed for some data storage device tests. The ability to use a faster disk speed for testing decreases the overall data storage device test time and allows the capabilities of the device to be fully realized sooner.

These and other features of various embodiments of the present disclosure can be understood in relation to the simplified version of an example data storage device 100 that may be used in accordance with some embodiments to store and retrieve user data from a host device. The device 100 includes a controller 102, such as a microcontroller, microprocessor, or application specific integrated circuit (ASIC), and a memory module 104. The controller 102 is a fixed or programmable processor based control circuit that provides top level communication and control functions as the device interfaces with the host device.

Data from the host device is transferred for storage into the memory 104, which can take a variety of volatile and/or non-volatile configurations, such as rotatable storage media and solid-state arrays. Various embodiments arrange at least one magnetic rotatable data storage medium 106 into a hard disc drive (HDD). Each medium 106 is rotated at a predetermined speed by a spindle motor 108 at a constant high velocity about a central axis 110. A plurality of concentric tracks, such as track 112, are defined on the various disk recording surfaces and accessed by a corresponding transducing head 114 that is positioned over a selected tack by a rotary actuator assembly 116 that pivots about a central actuator axis 118 in response to a voice coil motor 120.

Controlled application of current to the voice coil motor 120 induces controlled rotation of the actuator 116 about axis 118 and radial movement of the head(s) 114 across the disk surfaces. A preamplifier/driver circuit (preamp) 122 is operably coupled to each of the heads 114 and may be mounted, for example, to a side of the actuator assembly 116. Data transfers between a host device and the disks 106 are carried out using the preamp 122 and a read/write channel 124. During a data write operation, data to be written to the disks is buffered from the host, and encoded by the read/write channel 124 to supply a frequency modulated write signal which is supplied to the preamp 122. The preamp 122 generates and applies bi-directional write currents to one or more write elements 126 of the associated head 114 to write the data in the form of a sequence of magnetic flux transitions in a recording layer of the associated disc.

During a subsequent read operation, a read sensor 128 is aligned with a corresponding track 112 on which the data to be retrieved is resident. The transducing head 114 outputs a readback signal which is preconditioned by the preamp 122 and processed by the read/write channel 124 to recover the originally written data. The readback data are placed in a buffer memory pending transfer to the requesting host device. A servo control circuit 130 may provide closed loop positional control of the respective heads 114 during read and write operations.

Generally, demodulated servo data transduced from the disk surface is supplied to the servo control circuit 128 to provide an indication of the relative position of the associated head with a given track. The servo control circuit 130 outputs a current command signal to the voice coil motor 120 to adjust the position of the head 114 accordingly. The servo circuit 130 can be adapted to operate in a number of different servo positioning modes, including a seek mode in which a selected head 114 is moved from an initial track to a target track, and a track following mode in which the associated head is caused to follow a selected track.

Figure 2:
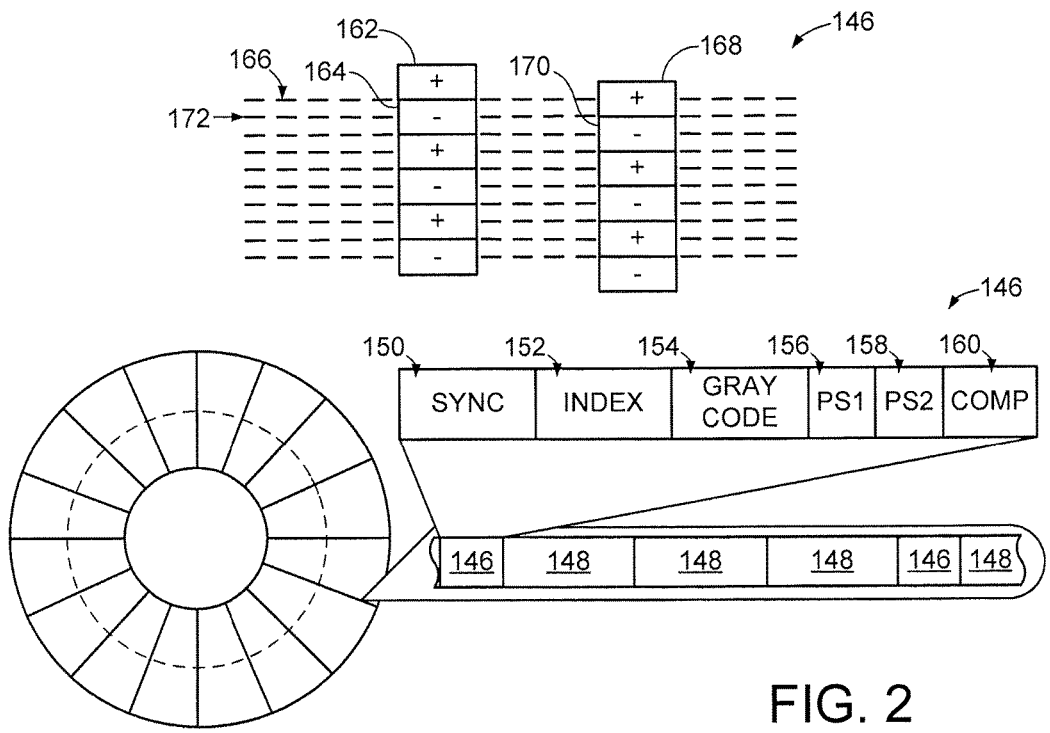
FIG. 2 displays assorted portions of an example data storage device capable of being utilized in the data storage system of FIG. 1.

FIG. 2 illustrates various portions of an example data storage medium 140 that is arranged in accordance with various embodiments to have a plurality of servo wedges 142 that continuously and radially extend across a plurality of different data tracks 144 on a surface of the medium (disk) 140. Each data track 144 can be formatted so that servo field 146 portions of different servo wedges 142, which stores servo data, are separated by user data regions 148 that collectively form a data block, or data sector, with a fixed amount of user data, such as 512 bytes.

Although a servo field 146 may contain any number, type, and size of data, some embodiments configure each servo field 146 with a synchronization (sync) field 150, an index field 152, a Gray code (track ID) field 154, servo positioning fields PS1 and PS2 156, 158, and a compensation field 160. Other formats can be used. Generally, the sync field 150 is a unique bit sequence to signal to the servo circuit passage of a servo field 146 adjacent the transducer 114. The index field 152 signifies the angular position of the servo field 146, and the Gray code field 154 signifies the radial position of the servo field 146 on the disk surface.

The PS1 and PS2 fields 156, 158 are alternating servo burst fields with variable polarities, as shown. For example, the PS1 fields 156 are each arranged as radially aligned positive (+) burst fields 162 and negative (−) burst fields 164. Servo nulls 166 are defined at the juncture between each adjacent pair of the bursts 162, 164.

Similarly, the PS2 fields 158 are each arranged as radially aligned positive (+) burst fields 168 and negative (−) burst fields 170. Servo nulls 172 are defined at the junction between each adjacent pair of the bursts 168, 170. The PS1 and PS2 fields are radially offset to define the nulls 166, 172 at half-track locations. These define so-called servo tracks that generally can each be viewed as having a centerline nominally corresponding to the servo nulls 166, and boundaries defined by the servo nulls 172. It is noted that other conventions can be used.

With the assorted components of a data storage device, a number of different tests can be conducted on one or more respective components at different times, locations, and with different equipment. FIGS. 3 and 4 respectively display line representations of example testing equipment that may be employed to conduct a variety of tests on at least one aspect of a data storage device. FIG. 3 illustrates an example spin stand 180 that can be utilized in accordance with some embodiments to test a data storage platter 182 and/or a transducing head 184 via at least one connected testing module 186 that directs an actuator 188 to position the head 184 over a predetermined data and/or servo track 190 as the platter 182 rotates about a central spindle hub 192

Although not required or limiting, the spin stand 180 can facilitate efficient testing throughput by mounting an individual data storage platter 182 facing a single transducing head 184. The spin stand 180 may be open to air, partially closed, or sealed. Regardless of the environment in which the platter 182 and head 184 are tested, the spin stand 180 is configured to conduct tests that verify the operation of the data writing and/or data reading portions of the transducing head 184, which may coincide with the writing of data to a platter 182 that is known to be properly arranged.

Conversely, a known good transducing head 184 can be used to test the presence and position of data sectors on the platter 182. For example, a verified head 184 can measure and confirm the operation of a servo data writer that previously formatted the platter 182 into user data and servo data sectors. It is contemplated that the spin stand 180 tests less than all of the platters 182 or heads 184 produced to ensure the quality of recent manufacturing prior to installation into a data storage device.

With the individual testing of a platter 182 or head 184, the spin stand 180 is understood as a precursor to device-level testing. FIG. 4 displays an example test rack 200 that can concurrently test more than one assembled data storage device 202. The test rack 200 may be any size and conduct any number of tests on the respective data storage devices 202 via a local or remote testing module 204. To facilitate efficient testing, the data storage devices 202 are positioned in slots of different compartments 206 of a common housing 208 that are accessed manually or via automated robotics 210. The different compartments allow for different tests to be conducted concurrently, such as temperature, humidity, and vibration tests.

It is noted that many tests for a data storage device 202 are conducted only after the device is assembled, which contrasts the spin stand 180 that tests individual components. The assembly of a data storage device 202 allows the test rack 200 to execute tests for various operational features. For instance, the test rack 200 can conduct tests that determine the fly height of a transducing head in relation to a data storage medium surface by modulating a slider heater portion of the data storage device 202 for various device operating temperatures. The ability to vary environmental conditions for a device 202 results in a data storage device 202 leaving the test rack with operating parameters that prolong the life, and reduce the risk of future errors.

While the test rack 200 may be employed to conduct one or more tests that evaluate the data tracks present on a data storage medium of a data storage device 202, data track testing can be delayed until the data storage device 202 is installed in an end-user computing system and user data begins to fill user data sections of the data storage media. The delay of the data track tests can be accomplished due to data track testing not being reliant on environmental variations like head fly height tests. Hence, the environmental modulation capabilities of the test rack 200 are not needed for data track testing and overall manufacturing time for a data storage device 202 can be reduced by delaying at least some track tests until the device 202 is incorporated into a user's system.

FIG. 5 graphs how much time is proportionally spent testing various aspects of a data storage device with a spin stand 180, test rack 200, or other testing equipment. Section 222 represents the number of hours associated with data track testing while section 244 corresponds with transducing head testing, section 226 is zone testing, and section 228 corresponds with set testing. It can be appreciated from FIG. 5 that a disproportionate amount of time is spent testing the various tracks on a data storage medium, which is ever increasing as greater numbers of data tracks are incorporated into a data storage device to heighten data capacity.

With such long track testing times, assorted embodiments conduct minimal track tests while data storage components, or assembled data storage devices, are being manufactured and delay at least one data track test until after device manufacturing and until the data storage device is being operated by an end-user. It is to be understood that testing during manufacturing is meant as tests with a spin stand 180, test rack 200, and other testing equipment located at a manufacturing facility, or facilities, prior to an assembled data storage device being installed in an end-user computing system and storing at least some user data in user data sectors of a data storage medium.

The nature of data track testing correlates testing time with the rotational speed of a data storage medium. Hence, faster rotation of a data storage disk during data track testing completes track testing in less time than if the disk rotated at a lower speed. It is noted that data track testing can utilize a higher disk rotational velocity because user data is not being written to user data sectors and instead preexisting servo data on the disk is being read. In other words, errors and timing issues does not allow high disk rotational speeds to be used to decrease overall testing time when data is being written.

The decrease in data track testing is represented by equation 1:

Total Test Time=Number of Test Tracks×(60/RPM)  (Equation 1)

where RPM corresponds with the revolutions per minute of a data storage disk. From equation 1, it can be appreciated that the total test time for data tracks is inversely proportional to the rotational velocity of the data storage disk.

Although a variety of different data track tests can conform to equation 1, assorted embodiments conduct zero acceleration path (ZAP) track testing with higher than default disk rotating speeds to take advantage of equation 1. The bar graphs of FIG. 6 illustrate how ZAP testing can decrease the overall track testing time, as shown by section 222 of FIG. 5, as a result of increasing the rotational velocity of a data storage disk being tested, such as from a 5400 rpm default user data writing disk velocity to a 7200 rpm track testing velocity.

Bars 232 and 234 convey the time needed to complete data track testing with default and test disk speeds where ZAP data is written to the data storage disk. Bars 236 and 238 convey the time needed to complete data track testing with default and test disk speeds in which ZAP data is read from the data storage disk. It can be appreciated from bars 234 and 238 that high rotational disk speeds can decrease data track testing by approximately 25% while greater time savings are possible with higher disk rotational speeds.

It is noted that while some ZAP tests can write data to portions of a data storage disk, the risk of unwanted data writing errors increases with higher rotating disk speeds. Hence, various embodiments exclude higher speed data track testing when data is written to the disk. As a result, data track tests can be conducted at the default disk rotational speed in some circumstances and a higher test speed in other circumstances when servo data can efficiently be sensed to complete a data track test. For instance, the radial position and configuration of the servo data on a disk, see FIG. 2, allows a variety of different test speeds that read servo data that would not be possible if data was written to the disk due to the timing associated with writing data to specific data sectors.

Figure 7:
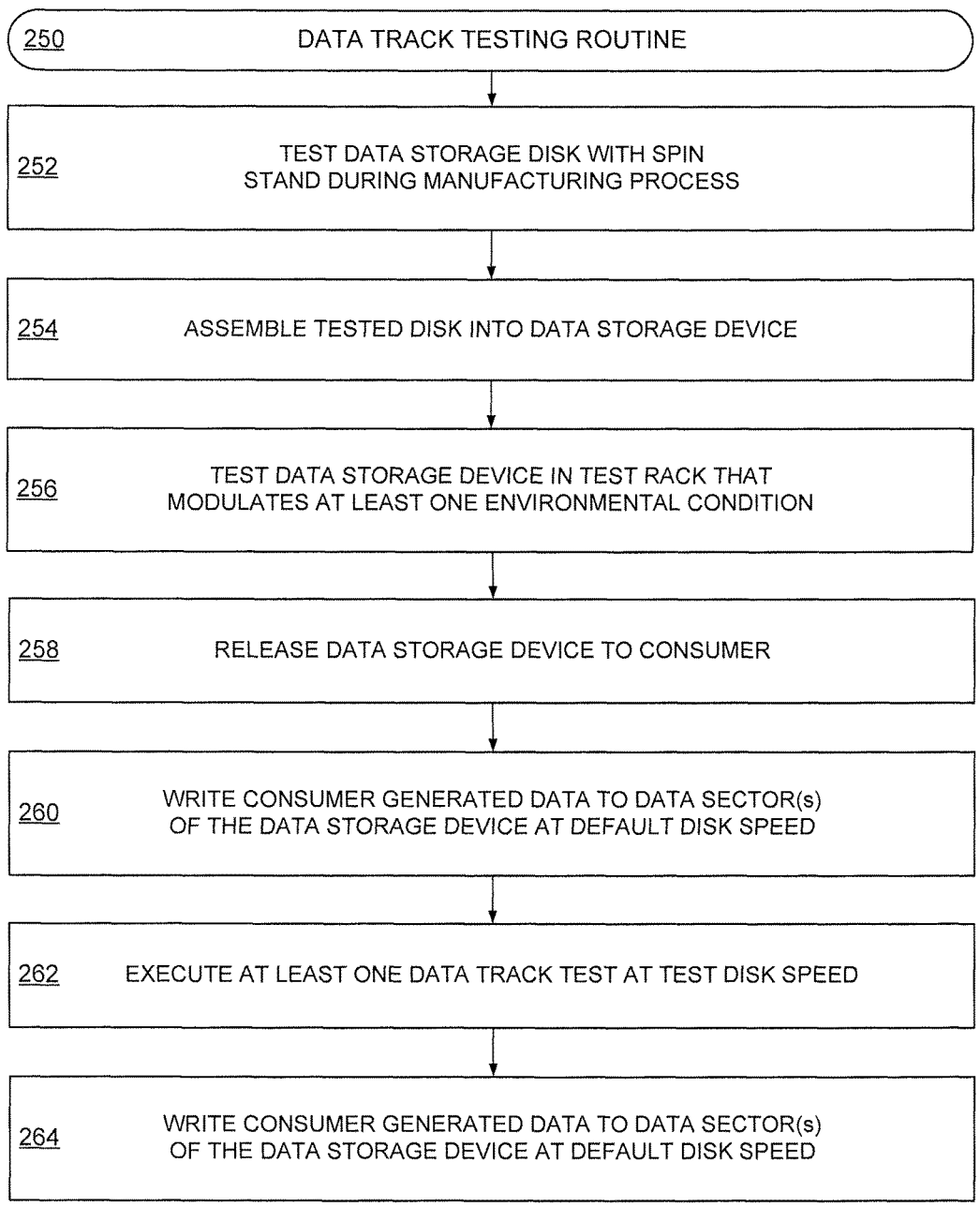
FIG. 7 provides a flowchart of an example data track testing routine that may be carried out in accordance with some embodiments.

FIG. 7 is a flowchart of an example data track testing routine 250 that can be carried out in accordance with various embodiments to decrease the time needed to test a data storage device during manufacturing. The routine 250 begins by testing a data storage disk on a spin stand during a manufacturing process at a factory in step 252. The spin stand test may evaluate any number of different data aspects, such as transducing head, zone, set, and track aspects. Step 254 then assembles the tested data storage disk into a data storage device that is subsequently inserted into a test rack and subjected to further testing in step 256 while the test rack modulates at least one environmental condition, such as temperature and/or vibration.

A data storage device that exits the test rack is then released to a consumer in step 258, which may occur with less than all device tests being conducted that are needed to allow complete operation of the data storage device. For example, step 258 may package, ship, and sell a data storage device to a consumer via an online or retail venue with the data storage device having reduced capabilities due to at least one test not yet being conducted. It is noted that the tests conducted during manufacturing, which can be characterized by spin stand and test rack tests, can enable consumer use of a predetermined portion, such as half, of the data storage device so that future tests are transparent to the end-user.

In a non-limiting example, a data storage device completes step 258 with what appears to the consumer as full functionality and capacity, but in fact has at least one scaled capability due to one or more pending data track tests. Next, step 260 writes consumer generated data to at least one data sector of a data storage disk of the data storage device while the disk rotates at a default speed, such as less than 7200 rpm. The consumer generated data may be application specific or general information that is meant to be stored in the data storage device for a long-term, such as days or months. The ability to write consumer generated data to a data sector echoes the data storage device leaving a manufacturing process capable of being used by the consumer, but having at least one pending data track test.

Step 262 proceeds to execute one or more data track tests, such as ZAP and/or repeated runout tests, by reading a position error signal (PES) portion of servo data while the data storage disk rotates at a test speed that is greater than the default speed. It is contemplated that the test speed is 7200 rpm or greater and is employed in step 262 to read the PES without reading or writing user generated data. The reading of only PES servo data simplifies timing and is generally more efficient than compensating for a transducing head's radial position on a disk. That is, the timing associated with reading servo data is consistent from a disk's inner diameter (ID) to its outer diameter (OD) while the timing to read user data sectors must be altered in relation to the head's position relative to the ID/OD.

As a result of the data track test(s) of step 262, one or more capabilities of the data storage device, such as data capacity and/or data writing speed, is enabled or enhanced. The optimized data storage device is then released for full operation by the consumer in step 264 by reducing the higher disk rotating test speed back to the default speed. It is noted that the various steps of routine 250 are not required and can be changed or replaced. Also, additional steps can be incorporated into routine 250, such as more data track testing at a test speed subsequent to step 264.

Through the use of a higher rotation speed, a data storage disk can be tested more efficiently. The ability to more quickly conduct data track testing allows a data storage device to be released to a consumer with pending tests, which reduces the manufacturing time of a data storage device. By intelligently executing data track tests with higher disk speeds after a data storage device has been used by an end-user consumer, such as during system idle times or prior to system shut down, manufacturing tests can be completed at a factory more quickly and/or tests can more thoroughly examine a data storage device during the manufacturing process. Regardless, the selective utilization of high disk speeds optimizes manufacturing while remaining transparent to an end-user consumer.

It is to be understood that even though numerous characteristics and configurations of various embodiments of the present disclosure have been set forth in the foregoing description, together with details of the structure and function of various embodiments, this detailed description is illustrative only, and changes may be made in detail, especially in matters of structure and arrangements of parts within the principles of the technology to the full extent indicated by the broad general meaning of the terms in which the appended claims are expressed. For example, the particular elements may vary depending on the particular application without departing from the spirit and scope of the present disclosure.

What is claimed is:

1. An apparatus comprising:
   a disk rotating about a spindle; and
   a transducing head configured to write data to the disk while the disk rotates at a default speed and conduct at least one test on the disk by reading servo data stored on the disk while the disk rotates at a test speed that is greater than the default speed.

2. The apparatus of claim 1, wherein the disk, spindle, transducing head, data sector, and servo data are collectively housed in a data storage device.

3. The apparatus of claim 1, wherein the disk comprises a plurality of servo wedges that each continuously extend from an inner diameter of the disk to an outer diameter of the disk.

4. The apparatus of claim 1, wherein the data sector is positioned between servo wedges.

5. The apparatus of claim 1, wherein first and second data sectors on the disk are positioned on separate data tracks.

6. A method comprising:
   writing data to a data sector with a transducing head while a disk spins about a spindle at a default speed; and
   executing a test on the disk by reading servo data stored on the disk while the disk spins at a test speed that is greater than the default speed.

7. The method of claim 6, wherein the test determines a zero acceleration path around the disk.

8. The method of claim 6, wherein the test measures non-repeating runout for the disk.

9. The method of claim 6, wherein the test measures a position error signal for the disk.

10. The method of claim 6, wherein the test is executed without writing data to a servo sector or a data sector of the disk.

11. The method of claim 6, wherein the test is executed after user data is written to the data sector.

12. The method of claim 6, wherein the default speed is 5400 rpm and the test speed is 7200 rpm or greater.

13. The method of claim 6, wherein the test speed is employed for a plurality of different tests on the disk.

14. The method of claim 13, wherein each of the plurality of different tests are dependent on at least one data track of the disk.

15. A method comprising:
   storing test data on a disk with a test stand while the disk rotates at a default speed;
   performing a first test on the test data with the test stand while the disk rotates at the default speed;
   removing the disk from the test stand with at least a second test pending;
   writing data to a data sector with a transducing head of while a disk spins about a spindle at a default speed; and
   executing a second test on the disk by reading servo data stored on the disk while the disk spins at a test speed that is greater than the default speed.

16. The method of claim 15, wherein the disk is incorporated into a computing device prior to writing the data sector at the default speed.

17. The method of claim 15, wherein non-test user data is written to the disk at the default speed.

18. The method of claim 15, wherein a third test is conducted on the disk at the default speed.

19. The method of claim 18, wherein the third test occurs after the first and second tests.

20. The method of claim 15, wherein the second test is executed passively without prompting by a user.

* * * * *